(12) United States Patent
Airey et al.

(10) Patent No.: US 6,550,151 B2
(45) Date of Patent: Apr. 22, 2003

(54) CONTOUR MEASURING DEVICE AND METHOD

(76) Inventors: Donald R. Airey, 185 Wilder Rd., Bolton, MA (US) 01740; Herman Servatius, 15 Trowbridge Rd., Worcester, MA (US) 01609

( * ) Notice: Subject to any disclaimer, the term of this patent is extended or adjusted under 35 U.S.C. 154(b) by 0 days.

(21) Appl. No.: 09/767,410

(22) Filed: Jan. 19, 2001

(65) Prior Publication Data

US 2002/0129505 A1 Sep. 19, 2002

(51) Int. Cl.[7] .................. G01C 19/00; G01C 7/004; E01C 23/01; G01B 5/20; G01B 5/26
(52) U.S. Cl. .................. 33/320; 33/521; 33/523; 33/1 H; 33/343; 33/124; 33/773; 33/624; 33/554
(58) Field of Search .............. 33/320, 521, 523, 33/1 H, 343, 121–124, 772–775, 624, 551, 553, 554, 779–782; 73/105, 178 R, 146

(56) References Cited

U.S. PATENT DOCUMENTS

| 275,734 A | | 4/1883 | Von Reitzner | 33/779 |
|---|---|---|---|---|
| 2,607,996 A | * | 8/1952 | Moyer | 33/331 |
| 2,679,163 A | * | 5/1954 | Moyer | 33/775 |
| 3,026,164 A | * | 3/1962 | Lancerini | 33/775 |
| 3,840,726 A | * | 10/1974 | Harrison | 73/178 R |
| 3,858,328 A | * | 1/1975 | La Rose | 33/319 |
| 4,144,576 A | * | 3/1979 | Mutton et al. | 33/123 |
| 4,173,073 A | * | 11/1979 | Fukazawa et al. | 33/1 Q |
| 4,176,458 A | * | 12/1979 | Dunn | 33/781 |
| 4,321,678 A | * | 3/1982 | Krogmann | 33/320 |
| 4,409,663 A | | 10/1983 | Becker et al. | 702/165 |
| 4,743,913 A | * | 5/1988 | Takai | 33/356 |
| 4,800,501 A | * | 1/1989 | Kinsky | 33/320 |
| 4,814,989 A | * | 3/1989 | Dobereiner et al. | 73/178 R |
| 4,833,787 A | * | 5/1989 | Steenwyk | 33/302 |
| 4,890,233 A | * | 12/1989 | Ando et al. | 33/320 |
| 4,986,121 A | * | 1/1991 | Luscombe | 73/178 R |
| 5,174,038 A | | 12/1992 | Neyens et al. | 33/521 |
| 5,317,515 A | * | 5/1994 | Matsuzaki | 701/221 |
| 5,339,684 A | * | 8/1994 | Jircitano et al. | 73/178 R |
| 5,440,484 A | * | 8/1995 | Kao | 33/356 |
| 5,440,923 A | * | 8/1995 | Arnberg et al. | 73/146 |
| 5,517,419 A | | 5/1996 | Lanckton et al. | 701/216 |
| 5,557,397 A | | 9/1996 | Hyde et al. | 356/5.01 |
| 5,956,660 A | | 9/1999 | Neumann | 702/150 |
| 5,999,878 A | | 12/1999 | Hanson et al. | 701/208 |

FOREIGN PATENT DOCUMENTS

| DE | 2922411 | * | 12/1980 | 33/320 |
|---|---|---|---|---|
| DE | 3925133 C1 | | 12/1990 | |
| DE | 4036424 A1 | | 5/1991 | |
| DE | 4115809 A1 | | 11/1992 | |
| DE | 19729355 A1 | | 1/1999 | |
| JP | 61-159105 | * | 7/1986 | 33/521 |
| JP | 3-90808 | * | 4/1991 | 33/521 |
| JP | 3-90809 | * | 4/1991 | 33/521 |
| JP | 3-138520 | * | 6/1991 | 33/320 |
| WO | 9627779 | | 9/1996 | |

* cited by examiner

Primary Examiner—Diego Gutierrez
Assistant Examiner—Stanley J. Pruchnic, Jr.
(74) Attorney, Agent, or Firm—Mintz, Levin, Cohn, Ferris, Glovsky & Popeo, P.C.; Ivor Elrifi; Gregory J. Sieczkiewicz

(57) ABSTRACT

The disclosed invention is an improvement on the traditional measuring wheel. When the odometry information is combined with two robust attitude sensors and an on-board computer, the instrument is able to perform useful measurements such as the calculation of an area or the description of a non-linear contour, as well as the traditional distance measurements and other uses.

27 Claims, 4 Drawing Sheets

| Distance Traveled | Magnetic Vector | | | Specific Force Vector | | |
|---|---|---|---|---|---|---|
| 0.00 | 0.62 | 0.41 | 0.67 | 0.18 | 0.08 | 0.98 |
| 1.25 | 0.62 | 0.41 | 0.67 | 0.18 | 0.09 | 0.98 |
| 2.50 | 0.62 | 0.42 | 0.67 | 0.18 | 0.09 | 0.98 |
| ... | ... | ... | ... | ... | ... | ... |
| 165.75 | 0.33 | 0.67 | 0.67 | 0.11 | 0.17 | 0.98 |
| 166.50 | 0.46 | 0.59 | 0.67 | 0.14 | 0.14 | 0.98 |
| 167.25 | 0.56 | 0.48 | 0.67 | 0.11 | 0.11 | 0.98 |

Figure 4

CONTOUR MEASURING DEVICE AND METHOD

TECHNICAL FIELD OF THE INVENTION

The invention pertains to a device and a method for accurately measuring the geometric characteristics of terrain by tracing the profile of the land surface with a wheeled instrument.

BACKGROUND OF THE INVENTION

The manually operated engineer's wheel is a classic tool of the surveyor's art. Typically, this instrument is a pole with an affixed handle at one end and a wheel with an odometer at the other end, with either a mechanical (U.S. Pat. No. 275,734) or electronic (U.S. Pat. No. 4,409,663) odometer.

The engineer's wheel is often used in the conjunction with other measuring instruments to produce a geometric representation of the terrain. Manual surveying is a time consuming and expensive process requiring a highly trained person.

Methods have been developed for automatic surveying of very large plots of land using motorized land vehicles, such as disclosed in U.S. Pat. No. 5,174,038, or aircraft, such as disclosed in U.S. Pat. No. 5,557,397, which naturally require very expensive equipment and highly skilled operators. Such large scale systems may depend on satellites, say via GPS or DGPS or photogrammetry (U.S. Pat. No. 5,517,419).

Small scale automated surveying systems, such as disclosed in U.S. Pat. No. 5,956,660 or German patent DE 19729355, based on inertial dead reckoning are subject to error accumulation, and so have limited practical value.

A useful addition to the engineer's wheel would be the ability to keep a precise record of its direction in a two-dimensional plane along with the distance traveled. Then areas and non-linear contours could be measured when a computer processed the data collected. Also, obstacles such as ponds, fences, trees and brush could be avoided when measuring a straight-line distance between two points. Several attempts have been made in this direction:

German patent DE4036424 discloses a three-wheeled device designed for flat terrain. The device contains two coaxial measuring wheels, which is sufficient to determine the contour of travel in the plane of motion of the device, subject to the usual error accumulation problem. An addendum to this patent, DE4115809, claims that, with the addition of an inclinometer along its forward axis, that device would have the capability to measure changes in elevation as well, but this will only be the case if the device moves directly up or down hill without moving across the grade in the slightest, which is a severe limitation.

Another attempt to measure contours is disclosed in German patent DE3925133, which, instead of a wheel, uses a ball that is able to roll in any direction on the surface to be surveyed. During its motion, this ball must maintain physical contact with the balls of two fixed computer mice. This device, besides being difficult and expensive to produce and maintain, is impractical and unsuitable for work outdoors since the dirt and moisture which comes in contact with the rolling ball is transferred to the bearings and the mice. Even in a clean environment, the device will suffer from the usual error of accumulation.

World patent WO9627779 discloses a method of profiling terrain with a device supported by at least one wheel equipped with an odometer, together with a single direction sensor to determine the direction of the wheel. To be practical, the guide-pole must be able to tip from side to side as well as rotate freely about the axle of the measuring wheel. A device with two degrees of freedom like a traditional measuring wheel needs two attitude sensors to properly report its orientation with respect to the world. A single direction sensor is not enough unless some assumptions are made about the pitch, roll or yaw of the device. The device of WO9627779 assumes that there is limited freedom of movement as there is only one incline angle detected for correcting the compass. There is also no method given for dealing with the effects of inertia, which will significantly corrupt the azimuth when the device is accelerated and decelerated.

SUMMARY OF THE INVENTION

The invention pertains to a device and method for making useful measurements of terrain features using a measuring wheel, two attitude sensors and a computing device.

BRIEF DESCRIPTION OF THE DRAWINGS

Other objects, features and advantages will occur to those skilled in the art from the following description of the preferred embodiments, and the accompanying drawings, in which:

FIG. 4 is an example of the sensor log stored in the device of the invention, and used to recreate the contour and, if relevant, the surface.

DETAILED DESCRIPTION OF THE INVENTION

Figure 1:
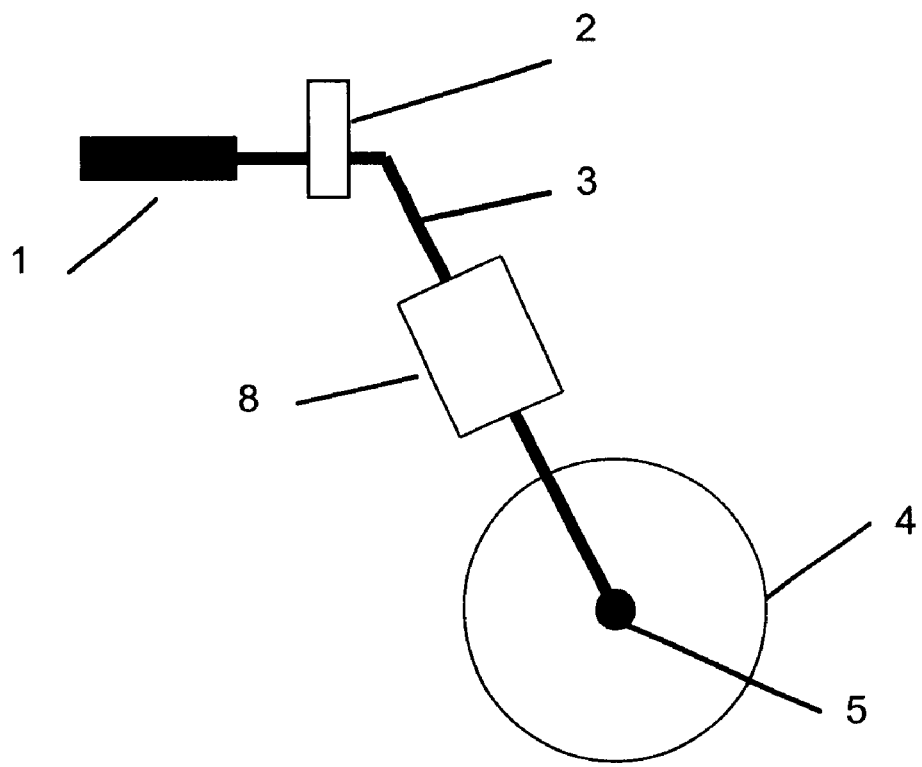
FIG. 1 is a schematic drawing that contains the mechanical requirements of a typical embodiment of the device of the invention.

Mechanically, the device consists of a single wheel and is propelled by the operator using a guide-pole and handle. A sensor compartment is rigidly mounted on the guide pole. Since the device is supported by a single wheel, the operator of this device has the same freedom of movement as has the operator of a classic engineer's wheel.

The measuring wheel on the device has a digital odometer, which measures the distance traveled. The instrument also has at least two attitude sensors that can determine the orientation of the device in three-dimensional space using relatively simple linear algebra. By 'attitude sensor' we mean any collection of transducers that are capable of measuring the direction of gravity, measuring the rotational change from an inertial reference point, or measuring the direction of a naturally occurring magnetic field with respect to the instrument's coordinate system.

In the real world there are no sensors that measure these natural forces without some corrupting influence such as inertial forces, stray magnetic fields or the limitations of the transducer itself. To be useful, measuring the magnitude of these forces—as well as the direction—is necessary to detect corruption and correct the sensors for real-life influences. Combinations of sensors also yield better real-life results than they do individually. For example, an inexpensive triad of gyroscopes can be used to correct for the inertial influences on the accelerometers. Likewise, the magnetometer can be used to correct the inherent 'drift' of the gyroscope sensors while the device is moving. Whatever transducers and methods are used, the goal of the sensors remains the untainted and repeatable sensing of the direction of two naturally occurring forces. The world orientation of the measuring device can be calculated from these two directions independent of the tilt and roll of the device and the grade of the terrain. Devices including magnetometers, e.g. model HMC 2001/2002 (Honeywell, Morristown, N.J.), accelerometers, e.g. model 1210 (Silicon Designs, Issaquah, Wash.), inclinometers, e.g. model NA060 (Nanotron, Phoenix, Ariz.) and gyroscopes, e.g. model ENV-05D-52 (Murata Electronics, Smyrna, Ga.), are commercially available.

The operator guides the measuring device over the terrain along the contour to be measured. The digital odometer and attitude sensors are combined in a sensor log, which is digitally stored on the portable computer attached to the device. The data collected from the sensors is transformed using the disclosed methods to yield a discrete record of the locations through which the instrument has traveled. The location information may be further processed to reveal other relevant geometric data. For example, the instrument can measure the linear distance between any two points on an arbitrary contour, or the enclosed area of a contour can be calculated.

The computing device on board the measuring device is an inexpensive portable computer. The user-interface, operational display and data collection are some of the functions provided by the on-board computer. The device also has the ability to store the data for post-processing by a larger, more powerful computer.

The device, resting on only one wheel, with the attitude sensors enclosed in a protective case, is able to easily roll over sloping, curving and irregular terrain, with the wheel maintaining constant contact with the ground, with minimal slippage.

Applications of such a device include, but are not limited to:

Measuring the distance traveled by the measuring wheel. This is the same information available with the current generation of measuring wheels.

Measuring the straight-line distance between two points when there are intervening obstacles. Ponds, fences, trees, houses, debris, etc. can be avoided and the device will still measure an accurate distance between two points.

Measuring area. This product has all the information to accurately calculate an area by traveling the perimeter. This is especially useful for measuring irregular contours, e.g. measuring the area of a curved driveway in order to determine the amount of asphalt needed to cover the surface.

Accident and crime scene reconstruction. The device can trace non-linear contours, e.g. tire marks on the road following an automobile accident, in much greater detail than existing measuring wheels. This facilitates a more accurate reconstruction of the event.

Mechanically, the preferred embodiment of the invention has a single wheel equipped with a digital odometer. The digital odometer can use optical or Hall-Effect technology and measures the rotation of the measuring wheel. Since the radius of the wheel is known, the length of the track over which the wheel is rolled can be determined. The sensor compartment is rigidly fixed to the device, so that the orientation of the device with respect to a fixed coordinate system can be determined.

A three-axis magnetometer measures the direction and magnitude of the Earth's magnetic field, $\vec{M_E}$, in the preferred embodiment of the device. That is, three magnetometers are positioned at orthogonal angles to provide a three dimensional vector that gives the direction and magnitude of the naturally occurring magnetic field with respect to the instrument.

In the preferred embodiment, an accelerometer measures the direction and magnitude of the total acceleration, $\vec{A_T}$, on the device. The acceleration is $\vec{A_T}=\vec{A_I}+\vec{A_G}$, where $\vec{A_I}$ is the acceleration with respect to a fixed inertial reference system and $\vec{A_G}$ is the acceleration due to the force of gravity. The acceleration sensor is constructed from three single-axis accelerometers positioned at orthogonal angles.

The inertial acceleration, $\vec{A_I}$, of the instrument has to be removed before the true direction of gravity, $\vec{A_G}$, can be determined. In the preferred embodiment, this is accomplished by measuring the angle between the magnetometer vector, $\vec{M_E}$, and the total acceleration vector, $\vec{A_T}$, when the device is at rest. When $|A_I|=0$, $\vec{A_T}=\vec{A_G}$. At any given latitude, the angle between $\vec{M_E}$ and $\vec{A_T}$ is constant as long as there are no inertial influences on the sensors. When the device detects that this angle has changed, the heading data is ignored. The odometer data is still valid and accumulates during these periods. When the uncorrupted gravity vector is detected again, the correct heading is read and a mathematical interpolation generates intermediate data points.

The sensitive axes of the attitude sensors must be aligned or at a known angles to each other. In the preferred embodiment, the forward, right and down axis of the magnetometer are collinear with the forward, right and down axis of the accelerometer.

These sensors are housed in an airtight, watertight, shock-resistant housing mounted on the guide pole. A microcontroller coordinates the analog-to-digital acquisition of the attitude sensors and turns the sensor readings into a formatted serial stream of information that can be read by the portable computer.

The operator activates the measuring wheel at the start of the operation with the device at the initial point of the contour to be measured. The operator pushes the device along the contour to be surveyed, which may typically be the perimeter of a patch of land to be surveyed. There are no restrictions on how the instrument is pushed along the ground related to the pitch or roll of the device. Any angle that is comfortable to the operator will work. The measuring wheel of the device needs to be kept in contact with the ground in order for the odometer to work properly.

While measuring, the instrument collects the sensory information at regular intervals, and stores this data in a sensor log. In the preferred embodiment, the sensor log contains: the distance traveled since the last sample, the three components of the magnetic vector and the three components of the acceleration vector. The stored information in the sensor log, together with the initial conditions, is sufficient to construct a two dimensional map of the traversed contours on the subject terrain using relatively simple mathematical formulas.

FIG. 1 demonstrates the essential mechanical features of the preferred embodiment of the device of the invention. Measuring wheel 4 is equipped with a digital odometer 5 and affixed to a guide-pole 3. A sensor compartment 8 is mounted on the guide-pole 3. Cables run from the sensors along the guide-pole 3 to the portable computer 2 mounted in a cradle on the handle 1.

Figure 2:
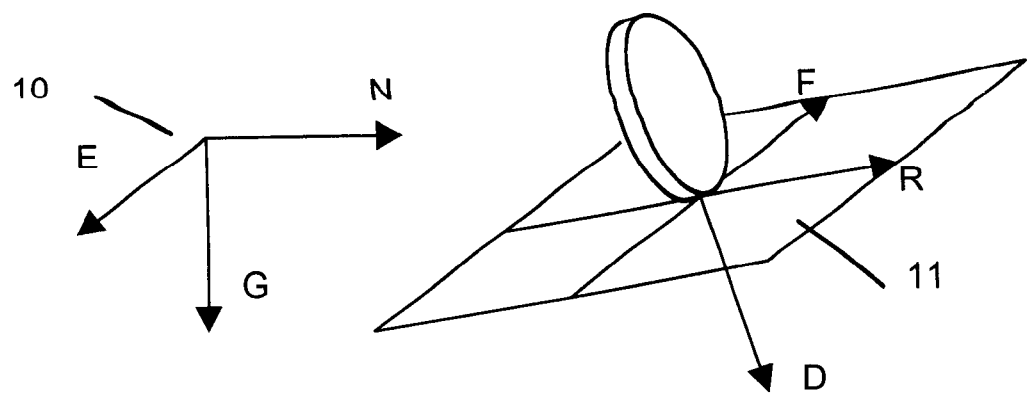
FIG. 2 show the relationship of the field vectors to the navigation vectors for the invention.
Figure 3:
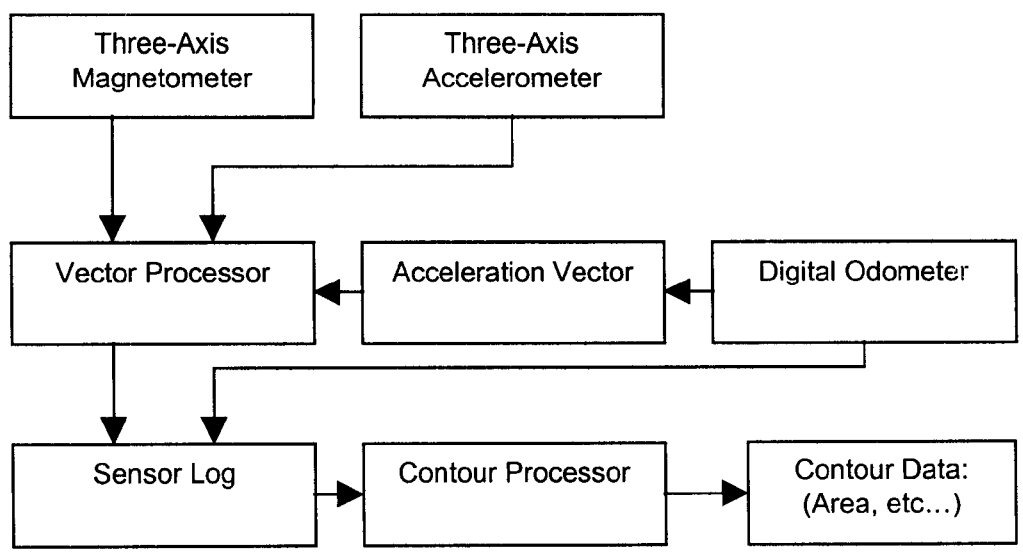
FIG. 3 is a block diagram illustrating the flow of information in the preferred embodiment of the invention.

In the following discussion, a coordinate system is an ordered triple of three linearly independent vectors, called basis vectors. FIG. 2 schematically depicts the two coordinate systems that are relevant to the invention. The world coordinate system 10 consists of three unit vectors $\vec{N}$, $\vec{E}$ and $\vec{G}$, nominally indicating North, East, and Down, respectively. The second coordinate system is the instrument coordinate system 11 consisting of three unit vectors $\vec{F}$, $\vec{R}$ and $\vec{D}$. The unit vector $\vec{F}$ indicates the direction of forward travel of the instrument. The unit vector $\vec{R}$ points in the direction of the axis of the wheel 4 and to the right of the device when viewed from behind. The unit vector $\vec{D}$ is perpendicular to both $\vec{F}$ and $\vec{R}$ and points from the center of the measuring wheel down toward the surface to be measured. Note that it is not necessary for the proper functioning of the device for $\vec{R}$ to point along the surface, or for $\vec{D}$ to point perpendicular to the surface. Ergonomically, this means that the device can tilt and roll without impacting the measurements.

Using the two sensor groups in the sensor compartment 8, the device measures the vectors, $\vec{M_E}$ and $\vec{A_T}$, with respect to the vehicle coordinate system. The vector $\vec{M_E}$ is the magnetic field vector. The vector $\vec{A_T}$ is the total acceleration of the device, $\vec{A_T} = \vec{A_I} + \vec{A_G}$, where $\vec{A_I}$ is the vector of inertial acceleration and $\vec{A_G}$ is the direction and magnitude of gravity. The vector $\vec{A_T}$ is used only when $|A_I|=0$, making it equivalent to $\vec{A_G}$. Alternatively, the vector $\vec{A_I}$ can be measured using the second derivative of the odometry information with respect to time and some assumptions about the direction of the instrument and removed from the total acceleration vector yielding $\vec{A_G}$.

The first step to extracting the orientation of the device in world coordinates is to convert the sensor vectors to unit vectors. The unit vector $\vec{M}$ points in the direction of Earth's magnetic field. The unit vector $\vec{G}$ indicates the direction of gravity.

$$\vec{M} = \frac{\vec{M_E}}{\sqrt{(M_E \cdot M_E)}}$$

$$\vec{G} = \frac{\vec{A_G}}{\sqrt{(A_G \cdot A_G)}}$$

These vectors are combined using Gram-Schmidt Orthogonalization to yield the unit vectors $\vec{N}$ and $\vec{E}$, pointing nominally to the north and east, respectively.

$$\vec{N_C} = \vec{M} - (\vec{M} \cdot \vec{G})\vec{G}$$

$$\vec{N} = \frac{\vec{N_C}}{\sqrt{(N_C \cdot N_C)}}$$

$$\vec{E} = \vec{G} \times \vec{N}$$

The vectors $\vec{G}$, $\vec{N}$, and $\vec{E}$, form the basis set for the world coordinate system. The forward vector, $\vec{F}$, is used to translate a change in the forward direction of the instrument—measured by the odometer—into a change in world coordinates. The forward vector, $\vec{F}$, is extracted from the basis set using the following relationship:

$$M = \begin{bmatrix} [N] \\ [E] \\ [G] \end{bmatrix} = [[F][R][D]].$$

Using the output $\Delta d$ of the odometer, the change in position of the device in three dimensions, $\Delta X$, may be computed as $$\Delta X = (\Delta d)F.$$

The three dimensional position of the device at the end of the N'th sampling step is then given by the vector equation:

$$X = X_0 + \sum_{k}^{N} \Delta X_k$$

The point $X_0$ is the initial position. Because the instrument lacks a sensor to detect changes in the grade, the measurements made are most accurate on a level, planar surface. Useful measurements can still be made on graded and three-dimensional surfaces.

FIG. 4 shows the data collected by the instrument in the sensor log. This information, when processed using the disclosed methods, produces locations in world coordinates that can be used for the disclosed applications.

Other Embodiments

While the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A measuring device for measuring contours to scale for the description of a landscape, the device comprising
   only one measurement wheel;
   an array of three orthogonally placed attitude sensors having sensitive axes wherein said sensors measure the orientation of said device in three-dimensional space;
   a computer; and
   a digital odometer,
   wherein said array of attitude sensors report said orientation electronically to said computer, and wherein said digital odometer measures the distance traveled by said measurement wheel relative to an arbitrary starting point.

2. The device of claim 1, wherein said array of attitude sensors comprises three non-collinear attitude sensors that measure the orientation of said measuring device with respect to a fixed coordinate system.

3. The device of claim 1, wherein a location of the measuring device on a coordinate system is determined by said array of attitude sensors, said array comprising an array of two or more magnetometers oriented at right angles to one another.

4. The device of claim 1, wherein a location of the measuring device on a coordinate system is determined by said array of attitude sensors, said array comprising an array of two or more accelerometers oriented at right angles to one another that report to said computer the attitude of the device relative to the Earth's gravitational field.

5. The device of claim 1, wherein said array of attitude sensors comprise an array of two or more accelerometers oriented at right angles to one another, wherein said two or more accelerometers filter out a corrupting inertial farce exerted upon the accelerometers resulting from acceleration or deceleration of the measuring device relative to the Earth.

6. The device of claim 1, wherein a location of the measuring device on a coordinate system is determined by said array of attitude sensors, said array comprising an array of two or more inclinometers oriented at known angles to one another and wherein said two or more inclinometers report to said computer the attitude of the device relative to the Earth's gravitational field.

7. The device of claim 1, wherein said array of attitude sensors comprises two or more inclinometers oriented at known angles to one another, wherein said two or more inclinometers filter out the corrupting inertial forces exerted upon the inclinometers resulting from acceleration or deceleration of the measuring device relative to the Earth.

8. The device of claim 1, wherein said array of attitude sensors comprises an array of three gyroscopes oriented at right angles to one another, wherein said array of three gyroscopes report to said computer the attitude of the device relative to an arbitrary inertial reference system.

9. The device of claim 1, wherein the sensitive axes of the attitude sensors are at a known geometry relative to one another.

10. The device of claim 1, wherein the array of attitude sensors comprises two or more sensors from the group consisting of accelerometers, magnetometers, inclinometers and gyroscopes, where said array of attitude sensors defines the direction of the device relative to the Earth's gravitational field, the Earth's magnetic field or an arbitrary inertial reference system.

11. The device of claim 1 wherein said computer is a portable computing device with peripherals for input and output.

12. The device of claim 1 wherein locations intermediate to the start and finish of the description of the landscape to be measured may be stored into the computer and integrated into a computed map.

13. The device of claim 1 wherein the digital odometer functions independently of the orientation sensors.

14. A method for measuring contours to scale for the description of a landscape, the method comprising
providing a measuring device comprising
only one measurement wheel;
an array of three orthogonally placed attitude sensors having sensitive axes, wherein said sensors measure the orientation of said device in three-dimensional space;
a computer having a sensor log; and
a digital odometer, wherein said digital odometer measures the distance traveled by said measurement wheel relative to an arbitrary starting point,
guiding said measuring device over a landscape;
collecting sensory information data from said array of attitude sensors and said digital odometer;
storing said sensory information in said sensor log; and
transforming stored information to yield a discrete record of the locations through which said device has traveled,
thereby measuring contours to scale for the description of a landscape.

15. The method of claim 14 wherein said array of attitude sensors comprises two non-collinear attitude sensors that measure direction of travel of said measuring device with respect to a fixed coordinate system.

16. The method of claim 14 wherein contours to scale are generated for the design and maintenance of roads, bridges, or landscapes.

17. The method of claim 14 wherein said method comprises measuring contours to scale for landscape changes resulting from geological events.

18. The method of claim 14 wherein the orientation of said device is measured by defining the attitude of the measuring device relative to an arbitrary inertial reference system.

19. The method of claim 14 wherein the orientation of said device is measured by defining the attitude of the measuring device relative to the Earth's magnetic field and by defining the attitude of the measuring device relative to the Earth's gravitational field.

20. The method of claim 14 wherein the orientation of said device is measured by defining the attitude of the measuring device with two or more attitude sensors relative to two or more members selected from the group consisting of the Earth's gravitational field, Earth's magnetic field and an arbitrary inertial reference system.

21. The method of claim 14 wherein said transforming step comprises isolating the direction of Earth's gravitational field from the direction of acceleration due to a change in inertial reference systems.

22. The method of claim 14 wherein said method further comprises visualizing direction of travel in real-time by said computer.

23. The method of claim 14 wherein said method comprises collecting and storing locations intermediate to the start and finish of description of the landscape.

24. The method of claim 14 wherein said contours to scale for description of a landscape are generated for the design and maintenance of roads, bridges, or landscapes.

25. The method of claim 14 wherein said method further comprises generating contour maps based upon continuous measurements.

26. The method of claim 25 wherein said contour maps are generated to analyze vehicular accidents.

27. The method of claim 14 wherein said method comprises describing landscape changes resulting from geological events.

* * * * *